United States Patent
Kim

(10) Patent No.: US 10,272,901 B2
(45) Date of Patent: Apr. 30, 2019

(54) METHOD AND APPARATUS FOR CONTROLLING MHSG OF MILD HYBRID ELECTRIC VEHICLE

(71) Applicants: Hyundai Motor Company, Seoul (KR); Kia Motors Corporation, Seoul (KR)

(72) Inventor: Hyun Kim, Hwaseong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 15/833,923

(22) Filed: Dec. 6, 2017

(65) Prior Publication Data

US 2018/0339696 A1    Nov. 29, 2018

(30) Foreign Application Priority Data

May 26, 2017    (KR) .................. 10-2017-0064984

(51) Int. Cl.
*B60W 20/10*    (2016.01)
*B60K 6/26*    (2007.10)

(52) U.S. Cl.
CPC ............ *B60W 20/10* (2013.01); *B60K 6/26* (2013.01); *B60K 2006/268* (2013.01); *B60W 2510/0638* (2013.01); *B60W 2510/0657* (2013.01); *B60W 2520/10* (2013.01); *B60W 2540/10* (2013.01); *B60W 2710/083* (2013.01); *B60Y 2200/92* (2013.01); *B60Y 2300/188* (2013.01); *B60Y 2400/47* (2013.01); *Y10S 903/906* (2013.01)

(58) Field of Classification Search
CPC ......... B60W 20/10; B60W 2510/0638; B60W 2710/083; B60W 2510/0657; B60W 2540/10; B60W 2520/10; B60K 6/26; B60K 2006/268; B60Y 2300/188; B60Y 2200/92; B60Y 2400/47; Y10S 903/906
See application file for complete search history.

(56) References Cited

U.S. PATENT DOCUMENTS

2006/0250114 A1*  11/2006  Faberman ................ H02K 3/50
                                                                 322/24
2012/0065864 A1*  3/2012  Whitney ............. F02D 41/0002
                                                                 701/102

FOREIGN PATENT DOCUMENTS

JP    2014-227072 A    12/2014
JP    2016-155410 A    9/2016
KR    10-1273000 B1    6/2013

* cited by examiner

*Primary Examiner* — Rodney A Butler
(74) *Attorney, Agent, or Firm* — Morgan, Lewis & Bockius LLP

(57) ABSTRACT

A method and an apparatus for controlling MHSG of a mild hybrid electric vehicle, may include detecting data for controlling the MHSG; determining a target torque of an engine based on the data; determining whether a pressure difference between a front end portion and a rear end portion of a particulate filter is equal to or greater than a first pressure based on the data; determining a loss amount of combustion torque of the engine based on the pressure difference when the pressure difference is equal to or greater than the first pressure; and performing torque compensation control of the MHSG based on the target torque of the engine and the loss amount of the combustion torque of the engine.

9 Claims, 4 Drawing Sheets

METHOD AND APPARATUS FOR CONTROLLING MHSG OF MILD HYBRID ELECTRIC VEHICLE

CROSS-REFERENCE TO RELATED APPLICATION

The present application claims priority to Korean Patent Application No. 10-2017-0064984 filed on May 26, 2017, the entire contents of which is incorporated herein for all purposes by this reference.

BACKGROUND OF THE INVENTION

Field of the Invention

The present invention relates to a method and an apparatus for controlling a mild hybrid starter & generator (MHSG) of a mild hybrid electric vehicle, and more particularly, the present invention relates to a method and apparatus for controlling an MHSG of a mild hybrid electric vehicle that may prevent deterioration of power performance of the mild hybrid electric vehicle in a response to increase of soot trapped in a particulate filter.

Description of Related Art

In general a hybrid electric vehicle utilizes an internal combustion engine and a battery power source together. The hybrid electric vehicle efficiently combines torque of the internal combustion engine and a torque of a motor.

Hybrid electric vehicles may be divided into a hard type and a mild type according to a power sharing ratio between an engine and a motor. In the case of the mild type of hybrid electric vehicle (hereinafter referred to as a mild hybrid electric vehicle), a mild hybrid starter & generator (MHSG) configured to start the engine or generate electricity according to an output of the engine is used instead of an alternator. In the case of the hard type of hybrid electric vehicle, a driving motor configured for generating driving torque is used in addition to an integrated starter & generator (ISG) configured to start the engine or generate electricity.

The MHSG may assist torque of the engine according to running states of the vehicle, and may charge a battery (e.g., a 48 V battery) through regenerative braking. Accordingly, fuel efficiency of the mild hybrid electric vehicle may be improved.

A particulate filter for trapping particulate matter (PM) contained in the exhaust gas is mounted in an exhaust pipe.

Generally, exhaust gas flowing out from an engine through an exhaust manifold is driven into a catalytic converter mounted at the exhaust pipe and is purified therein. After that, the noise of the exhaust gas is decreased while passing through a muffler and then the exhaust gas is emitted into the air through a tail pipe. The catalytic converter purifies pollutants contained in the exhaust gas.

When particulate matter (soot) trapped in the particulate filter is increased, the performance of the particulate filter deteriorates and the particulate filter is damaged in a worst case. Accordingly, when an amount of the particulate matter trapped in the particulate filter is greater than a predetermined amount, the particulate matter is burnt and removed. It is called a regeneration of the particulate filter.

Furthermore, when the amount of the particulate matter trapped in the particulate filter is increased, exhaust pressure of the engine is increased and output of the engine is decreased. Accordingly, a method for compensating the output of the engine is required while performing the regeneration of the particulate filter.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method and apparatus for controlling a mild hybrid starter & generator (MHSG) of a mild hybrid electric vehicle having advantages of preventing deterioration of power performance of the mild hybrid electric vehicle in a response to increase of soot trapped in a particulate filter.

A method for controlling a mild hybrid starter & generator (MHSG) of a mild hybrid electric vehicle according to an exemplary embodiment of the present invention may include: detecting data for controlling the MHSG; determining a target torque of an engine based on the data; determining whether a pressure difference between a front end portion and a rear end portion of a particulate filter is equal to or greater than a first pressure based on the data; determining a loss amount of combustion torque of the engine based on the pressure difference when the pressure difference is equal to or greater than the first pressure; and performing torque compensation control of the MHSG based on the target torque of the engine and the loss amount of the combustion torque of the engine.

The target torque of the engine may be determined based on a position of an accelerator pedal, a speed of the mild hybrid electric vehicle, and a rotation speed of the engine.

The performing of the torque compensation control of the MHSG may include: determining a target torque of the MHSG based on the target torque of the engine and the loss amount of the combustion torque of the engine; and controlling the MHSG to generate the target torque of the MHSG.

The method may further include: determining whether the pressure difference is equal to or less than a second pressure while performing the torque compensation control of the MHSG; releasing the torque compensation control of the MHSG when the pressure difference is equal to or less than the second pressure.

An apparatus for controlling a mild hybrid starter & generator (MHSG) of a mild hybrid electric vehicle according to an exemplary embodiment of the present invention may include: a data detector detecting data for controlling the MHSG; and a controller determining a target torque of an engine based on the data and determining whether a pressure difference between a front end portion and a rear end portion of a particulate filter is equal to or greater than a first pressure, wherein the controller may be configured to determine a loss amount of a combustion torque of the engine based on the pressure difference when the pressure difference is equal to or greater than the first pressure, and may perform torque compensation control of the MHSG based on the target torque of the engine and the loss amount of the combustion torque of the engine.

The controller may be configured to determine the target torque of the engine based on a position of an accelerator pedal, a speed of the mild hybrid electric vehicle, and a rotation speed of the engine.

The controller may be configured to determine a target torque of the MHSG based on the target torque of the engine and the loss amount of the combustion torque of the engine, and controls the MHSG to generate the target torque of the MHSG.

The controller may be configured to determine whether the pressure difference is equal to or less than a second pressure while performing the torque compensation control of the MHSG, and may release the torque compensation control of the MHSG when the pressure difference is equal to or less than the second pressure.

The data detector may include: an accelerator pedal position detector configured for detecting a position of an accelerator pedal; a vehicle speed detector configured for detecting a speed of the mild hybrid electric vehicle; an engine speed detector configured for detecting a rotation speed of the engine; and a pressure difference detector configured for detecting the pressure difference between the front end portion and the rear end portion of the particulate filter.

According to an exemplary embodiment of the present invention, even though the loss amount of the torque of the engine is increased in a response to increase of soot trapped in the particulate filter, power performance of the mild hybrid electric vehicle may be prevented from being deteriorated by use of the MHSG.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
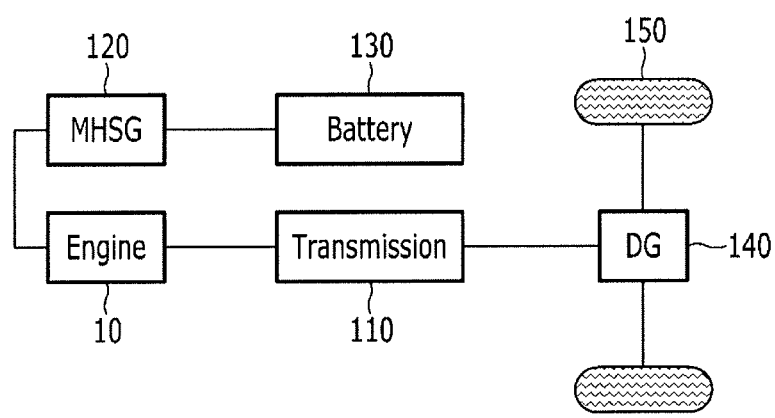
FIG. 1 is a diagram of a mild hybrid electric vehicle according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In the following detailed description, various exemplary embodiments of the present application will be described more fully with reference to the accompanying drawings, in which exemplary embodiments of the invention are shown. However, the present invention is not limited the exemplary embodiments which are described herein, and may be modified in various different ways.

Parts which are not related with the description are omitted for clearly describing the exemplary embodiment of the present invention, and like reference numerals refer to like or similar elements throughout the specification.

Since each component in the drawings is arbitrarily illustrated for easy description, the present invention is not limited to the components illustrated in the drawings.

FIG. 1 is a diagram of a mild hybrid electric vehicle according to an exemplary embodiment of the present invention.

As shown in FIG. 1, a mild hybrid electric vehicle according to an exemplary embodiment of the present invention includes an engine 10, a transmission 110, a mild hybrid starter & generator (MHSG) 120, a battery 130, a differential gear apparatus 140, and a wheel 150.

With reference to torque transmission of a mild hybrid electric vehicle, torque generated from the engine 10 is transmitted to an input shaft of the transmission 110, and a torque output from an output shaft of the transmission 20 is transmitted to an axle via the differential gear apparatus 140. The axle rotates the wheel 150 such that the mild hybrid electric vehicle runs by the torque generated from the engine 10.

The MHSG 120 may initiate the engine 10 or generate electricity according to an output of the engine 10. Furthermore, the MHSG 120 may assist the torque of the engine 10. The torque of the engine 10 may be used as main torque, and a torque of the MHSG 120 may be used as auxiliary torque.

The battery 130 may supply electricity to the MHSG 120, and may be charged through electricity recovered by the MHSG 120. The battery 130 may be a 48 V battery. The mild hybrid electric vehicle may further include a low voltage battery DC-DC converter (LDC) converting a voltage supplied from the battery 130 into a low voltage, and a 12 V battery supplying a low voltage to electrical loads (e.g., a head lamp and an air conditioner).

Figure 2:
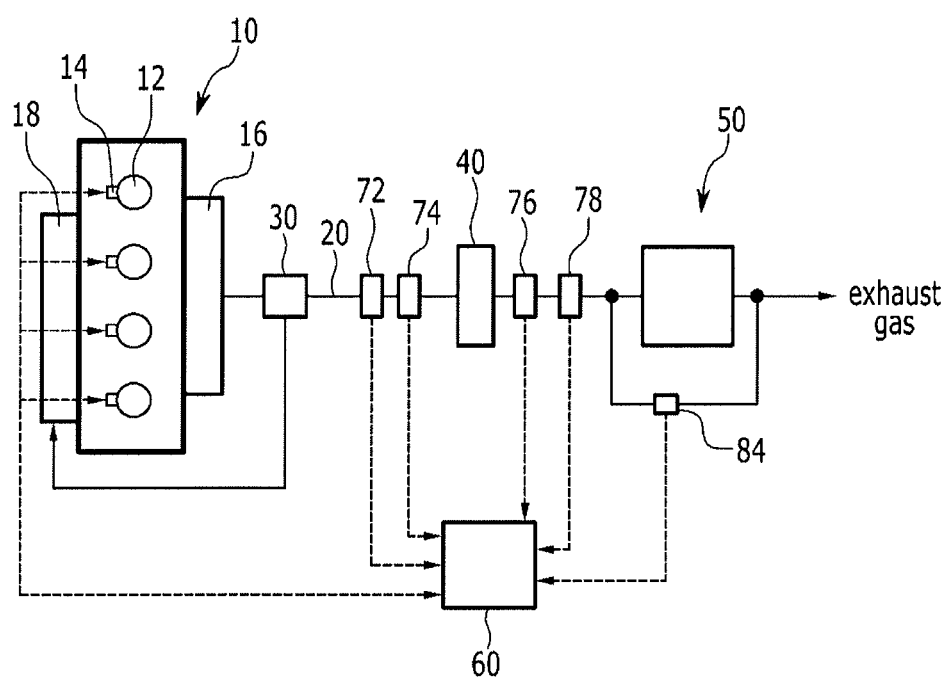
FIG. 2 is a schematic diagram of an exhaust system to which a method for controlling a mild hybrid starter & generator (MHSG) of a mild hybrid electric vehicle according to an exemplary embodiment of the present invention.

FIG. 2 is a schematic diagram of an exhaust system to which a method for controlling a mild hybrid starter & generator (MHSG) of a mild hybrid electric vehicle according to an exemplary embodiment of the present invention.

As shown in FIG. 2, an exhaust system may include the engine 10, an exhaust pipe 20, an Exhaust Gas Recirculation (EGR) apparatus 30, a denitrification catalyst (DeNOx catalyst) 40, a particulate filter 50, and a controller 60.

The engine 10 combusts fuel and air to convert chemical energy into mechanical energy. The engine 10 is connected to an intake manifold 18 to receive the air in a combustion chamber 12, and exhaust gas generated in a combustion process is gathered in an exhaust manifold 16 and is expelled to the external of the engine 10. An injector 14 is mounted in the combustion chamber 12 to inject the fuel into the combustion chamber 12.

A diesel engine is exemplified herein, but a gasoline engine may be used. In a case that the gasoline engine is used, the air-fuel mixture flows into the combustion chamber 12 through the intake manifold 18, and a spark plug is mounted at an upper portion of the combustion chamber 12. Furthermore, if a gasoline direct injection (GDI) engine is used, the injector 14 is mounted at the upper portion of the combustion chamber 12.

The exhaust pipe 20 is connected to the exhaust manifold 16 to exhaust the exhaust gas to the external of a vehicle. The denitrification catalyst 40 and the particulate filter 50 are mounted on the exhaust pipe 20 and remove hydrocarbons, carbon monoxide, and nitrogen oxide (NOx) contained in the exhaust gas.

The exhaust gas recirculation apparatus 30 is mounted on the exhaust pipe 20, and a portion of the exhaust gas expelled from the engine 10 is supplied back to the engine 10 through the exhaust gas recirculation apparatus 30. Furthermore, the exhaust gas recirculation apparatus 30 is connected to the intake manifold 18 to control combustion temperature by mixing a portion of the exhaust gas with the air. Such control of the combustion temperature is performed by controlling amount of the exhaust gas supplied back to the intake manifold 18 by control of the controller 60.

A first oxygen detector 72 is mounted on the exhaust pipe 20 downstream of the exhaust gas recirculation apparatus 30. The first oxygen detector 72 detects oxygen amount in the exhaust gas passing through the exhaust gas recirculation apparatus 30 and transmits a signal corresponding thereto to the controller 60.

Furthermore, a first temperature detector 74 is mounted on the exhaust pipe 20 downstream of the exhaust gas recirculation apparatus 30 and detects temperature of the exhaust gas passing through the exhaust gas recirculation apparatus 30.

The denitrification catalyst 40 is mounted on the exhaust pipe 20 downstream of the exhaust gas recirculation apparatus 30. The denitrification catalyst 40 absorbs the nitrogen oxide (NOx) contained in the exhaust gas at a lean air-fuel ratio, and releases the absorbed nitrogen oxide (NOx) and reduces the nitrogen oxide (NOx) contained in the exhaust gas or the released nitrogen oxide (NOx) at a rich air-fuel ratio. A lean NOx trap (LNT) catalyst may be used as the denitrification catalyst 40. Furthermore, the denitrification catalyst 40 may oxidize carbon monoxide (CO) and hydrocarbon (HC) contained in the exhaust gas.

A second oxygen detector 76 and a second temperature detector 78 are mounted on the exhaust pipe 20 downstream of the denitrification catalyst 40.

The second oxygen detector 76 detects oxygen amount contained in exhaust gas flowing into the particulate filter 60 and transmits a signal corresponding thereto to the controller 60. The controller 60 may perform the lean/rich control of the exhaust gas based on the detected values by the first oxygen detector 72 and the second oxygen detector 76.

The second temperature detector 78 detects temperature of the exhaust gas flowing into the particulate filter 50 and transmits a signal corresponding thereto to the controller 60.

The particulate filter 50 is mounted on the exhaust pipe 20 downstream of the denitrification catalyst 40. The particulate filter 50 may be a diesel particulate filter (DPF) or a gasoline particulate filter (GPF), and traps particulate matter (PM) contained in the exhaust gas.

Furthermore, an oxidizing catalyst may be coated at the particulate filter 50. Such an oxidizing catalyst oxidizes hydrocarbon and carbon monoxide contained in the exhaust gas into carbon dioxide, and oxidizes nitrogen monoxide contained in the exhaust gas into nitrogen dioxide.

A pressure difference detector 84 is mounted at the exhaust pipe 20. The pressure difference detector 84 detects pressure difference between a front end portion and a rear end portion of the particulate filter 50, and transmits a signal corresponding thereto to the controller 60. The controller 60 may determine that regeneration of the particulate filter 50 is necessary when the pressure difference detected by the pressure difference detector 84 is equal to or greater than a predetermined pressure. In the instant case, the injector 14 post-injects the fuel to burn the particulate matter trapped in the particulate filter 50.

The controller 60 determines a driving condition of the engine 10 based on the signals of the sensors, and performs the lean/rich control and controls the regeneration of the particulate filter 50 based on the driving condition of the engine 10.

Figure 3:
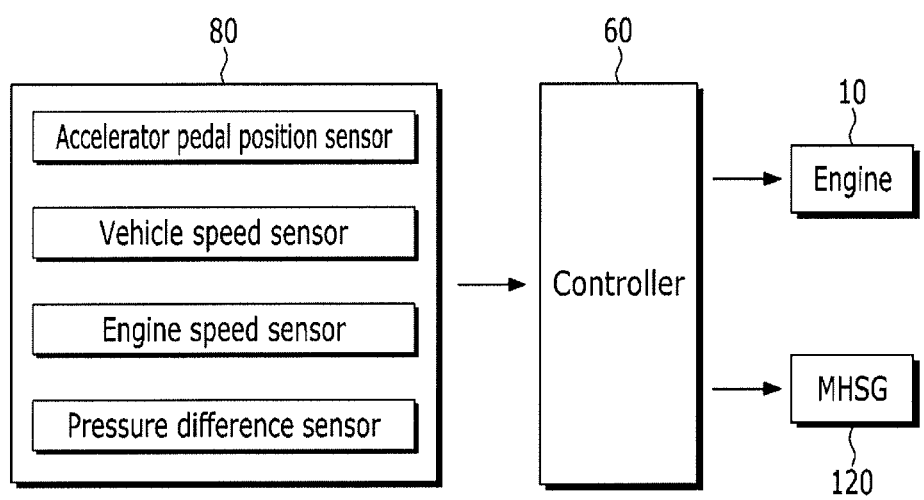
FIG. 3 is a diagram illustrating an apparatus for controlling a mild hybrid starter & generator (MHSG) of a mild hybrid electric vehicle according to an exemplary embodiment of the present invention.

FIG. 3 is a diagram illustrating an apparatus for controlling a mild hybrid starter & generator (MHSG) of a mild hybrid electric vehicle according to an exemplary embodiment of the present invention.

As shown in FIG. 3, an apparatus for controlling a mild hybrid starter & generator (MHSG) according to an exemplary embodiment of the present invention includes a data detector 80 and the controller 60.

The data detector 80 detects data for controlling the MHSG 120, and data detected by the data detector 80 is transmitted to the controller 60. The data detector 80 may include an accelerator pedal position detector 81, a vehicle speed detector 82, an engine speed detector 83, and the pressure difference detector 84. The data detector 80 may further include other detectors (e.g., a brake pedal position detector, an SOC detector, and the like) for controlling the mild hybrid electric vehicle.

The accelerator pedal position detector 81 detects a position of an accelerator pedal (i.e., a pushed degree of the accelerator pedal) and transmits a signal corresponding thereto to the controller 60. When the accelerator pedal is pushed completely, the position of the accelerator pedal is 100%, and when the accelerator pedal is not pushed, the position of the accelerator pedal is 0%.

The vehicle speed detector 82 detects a speed of the mild hybrid electric vehicle, and transmits a signal corresponding thereto to the controller 60.

The engine speed detector 83 detector detects a rotation speed of the engine 10, and transmits a signal corresponding thereto to the controller 60. The engine speed detector 83 may detect the rotation speed of the engine 10 from a phase change of a crankshaft.

The pressure difference detector 84 detects pressure difference between a front end portion and a rear end portion of the particulate filter 50, and transmits a signal corresponding thereto to the controller 60.

The controller 60 controls the MHSG 120 based on the data detected by the data detector 80. The controller 60 may determine a target torque of the engine 10 for running the mild hybrid electric vehicle based on the data, and may determine a combustion torque of the engine 10 and a target torque of the MHSG 120 to satisfy the target torque of the engine 10. For these purposes, the controller 60 may be implemented with one or more processors executed by a predetermined program. The predetermined program may include a series of commands for performing each step included in a method for controlling a mild hybrid starter & generator (MHSG) of a mild hybrid electric vehicle according to an exemplary embodiment of the present invention to be described below.

Figure 4:
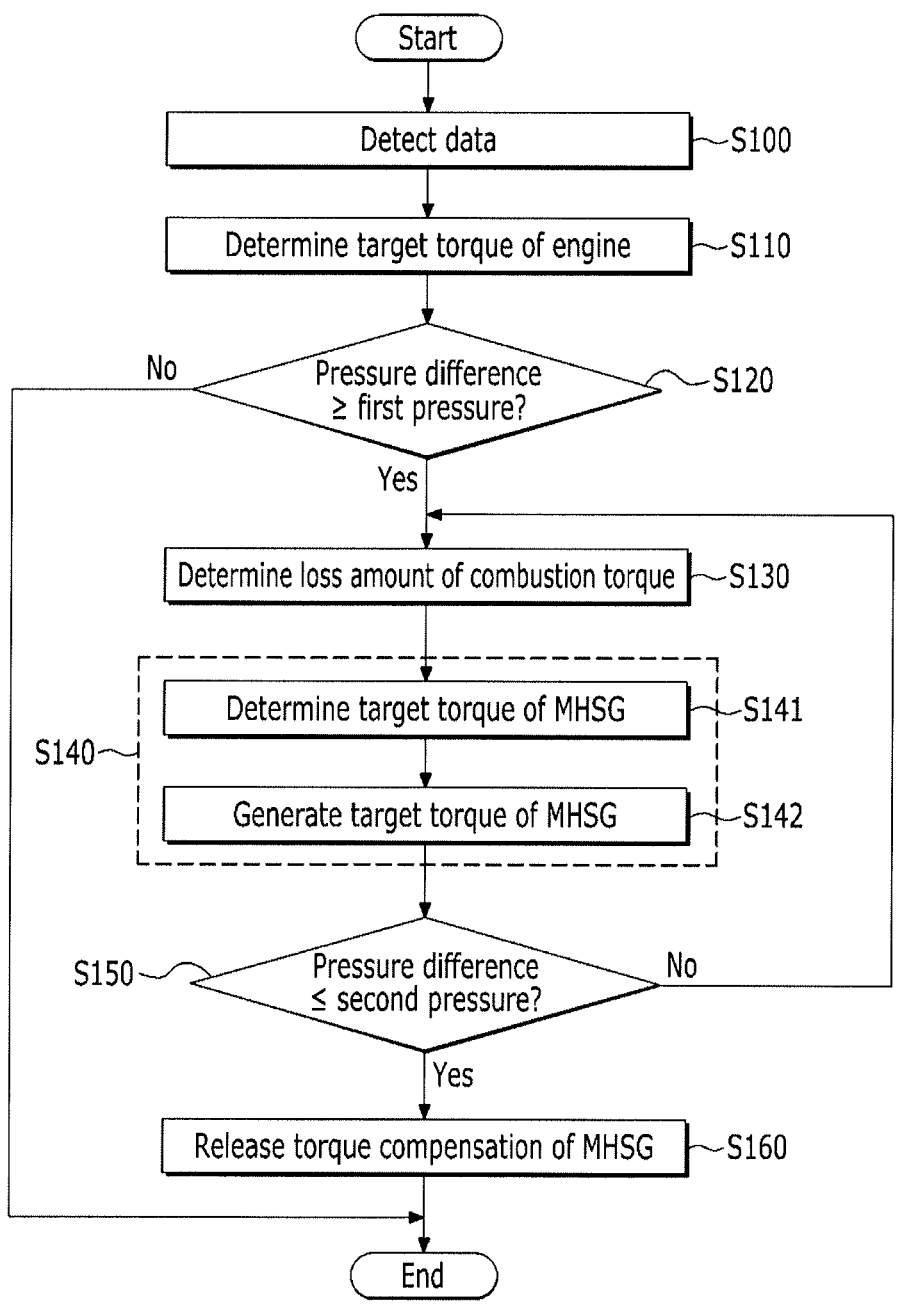
FIG. 4 is a flowchart of a method for controlling a mild hybrid starter & generator (MHSG) of a mild hybrid electric vehicle according to an exemplary embodiment of the present invention.

FIG. 4 is a flowchart of a method for controlling a mild hybrid starter & generator (MHSG) of a mild hybrid electric vehicle according to an exemplary embodiment of the present invention.

As shown in FIG. 4, a method for controlling a mild hybrid starter & generator (MHSG) of a mild hybrid electric vehicle according to an exemplary embodiment of the present invention may begin with detecting data for controlling the MHSG 120 at step S100. In other words, the accelerator pedal position detector 81 detects the position of the accelerator pedal, the vehicle speed detector 82 detects the speed of the mild hybrid vehicle, the engine speed detector 83 detects the rotation speed of the engine 10, and the pressure difference detector 84 detects the pressure difference between the front end portion and the rear end portion of the particulate filter 50.

The controller 60 determines a target torque of the engine 10 based on the data at step S110. The controller 60 may determine the target torque of the engine 10 based on the position of the accelerator pedal, the speed of the mild hybrid electric vehicle, and the rotation speed of the engine 10. The controller 60 may determine a combustion torque of the engine 10 and a target torque of the MHSG 120 to satisfy the target torque of the engine 10. The controller 60 may control ignition timing, a fuel amount, and an air-fuel ratio to generate the combustion torque of the engine 10.

The controller 60 determines whether the pressure difference between the front end portion and the rear end portion of the particulate filter 50 is equal to or greater than a first pressure at step S120. The first pressure may be set by experiments. More specifically, the first pressure may be set by a person of ordinary skill in the art based on a pressure difference between the front end portion and the rear end portion of the particulate filter 50 influencing a combustion torque of the engine 10.

When the pressure difference between the front end portion and the rear end portion of the particulate filter 50 is less than the first pressure at step S120, the controller 60 finishes the method for controlling the MHSG according to an exemplary embodiment of the present invention. In the instant case, the controller 60 may control the engine 10 and the MHSG 120 based on the determined combustion torque of the engine 10 and the determined target torque of the MHSG 120.

When the pressure difference between the front end portion and the rear end portion of the particulate filter 50 is equal to or greater than the first pressure at step S120, the controller 60 determines a loss amount of the combustion torque of the engine 10 based on the pressure difference between the front end portion and the rear end portion of the particulate filter 50 at step S130. The loss amount of the combustion torque of the engine 10 may be set by experiments. More specifically, the loss amount of the combustion torque is increased as the pressure difference between the front end portion and the rear end portion of the particulate filter 50 is increased.

The controller 60 performs torque compensation control of the MHSG 120 based on the target torque of the engine 10 and the loss amount of the combustion torque of the engine 10 at step S140.

More specifically, the controller 60 determines a target torque of the MHSG 120 based on the target torque of the engine 10 and the loss amount of the combustion torque of the engine at step S141. The controller 60 determines the target torque of the MHSG 120 so that torque of the MHSG 120 is increased by the loss amount of the combustion torque of the engine 10 to satisfy the target torque of the engine 10.

The controller 60 controls the MHSG 120 to generate the target torque of the MHSG 120 at step S142. Accordingly, even though the combustion torque of the engine 10 is decreased by increase of the pressure difference between the front end portion and the rear end portion of the particulate filter 50, the target torque of the engine 10 may be satisfied by compensating the combustion torque of the engine 10 using the MHSG.

While performing the torque compensation control of the MHSG 120, the controller 60 determines whether the pressure difference between the front end portion and the rear end portion of the particulate filter 50 is equal to or less than a second pressure at step S150. The second pressure may be set by experiments. More specifically, the second pressure may be set by a person of ordinary skill in the art to determine whether the torque compensation control is not required. When the pressure difference between the front end portion and the rear end portion of the particulate filter 50 is high, the controller 60 enters a regeneration mode of the particulate filter 50 and controls the injector 14 to post-inject the fuel to increase a temperature of the exhaust gas. Accordingly, the particulate matter trapped in the particulate filter 50 is burnt and the pressure difference between the front end portion and the rear end portion of the particulate filter 50 is decreased.

When the pressure difference between the front end portion and the rear end portion of the particulate filter 50 is greater than the second pressure at step S150, the controller 60 may return to step S130.

When the pressure difference between the front end portion and the rear end portion of the particulate filter 50 is equal to or less than the second pressure at step 150, the controller 60 releases the torque compensation control of the MHSG 120 at step S160. In other words, the controller 60 may control the engine 10 and the MHSG 120 without considering the loss amount of the torque of the engine 10 in a response to increase of the pressure difference between the front end portion and the rear end portion of the particulate filter 50.

As described above, according to an exemplary embodiment of the present invention, even though the loss amount of the torque of the engine 10 is increased in a response to increase of soot trapped in the particulate filter 50, power performance of the mild hybrid electric vehicle may be prevented from being deteriorated by use of the MHSG 130.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for controlling a mild hybrid starter & generator (MHSG) of a mild hybrid electric vehicle, comprising:
   detecting data for controlling the MHSG;
   determining, by a controller, a target torque of an engine based on the data;
   determining, by the controller, whether a pressure difference between a front end portion and a rear end portion of a particulate filter is equal to or greater than a first pressure based on the data;
   determining, by the controller, a loss amount of combustion torque of the engine based on the pressure difference when the pressure difference is equal to or greater than the first pressure; and
   performing by the controller, torque compensation control of the MHSG based on the target torque of the engine and the loss amount of the combustion torque of the engine.

2. The method of claim 1, wherein the target torque of the engine is determined based on a position of an accelerator pedal, a speed of the mild hybrid electric vehicle, and a rotation speed of the engine.

3. The method of claim 1, wherein the performing of the torque compensation control of the MHSG comprise:
   determining a target torque of the MHSG based on the target torque of the engine and the loss amount of the combustion torque of the engine; and
   controlling the MHSG to generate the target torque of the MHSG.

4. The method of claim 1, further including:
   determining whether the pressure difference is equal to or less than a second pressure while performing the torque compensation control of the MHSG;
   releasing the torque compensation control of the MHSG when the pressure difference is equal to or less than the second pressure.

5. An apparatus for controlling a mild hybrid starter & generator (MHSG) of a mild hybrid electric vehicle, comprising:
   a data detector detecting data for controlling the MHSG; and
   a controller configured for determining a target torque of an engine based on the data and determining whether a pressure difference between a front end portion and a rear end portion of a particulate filter is equal to or greater than a first pressure,
   wherein the controller is configured to determine a loss amount of a combustion torque of the engine based on the pressure difference when the pressure difference is equal to or greater than the first pressure, and is configured to perform torque compensation control of the MHSG based on the target torque of the engine and the loss amount of the combustion torque of the engine.

6. The apparatus of claim 5, wherein the controller is configured to determine the target torque of the engine based on a position of an accelerator pedal, a speed of the mild hybrid electric vehicle, and a rotation speed of the engine.

7. The apparatus of claim 5, wherein the controller is configured to determine a target torque of the MHSG based on the target torque of the engine and the loss amount of the combustion torque of the engine, and is configured to control the MHSG to generate the target torque of the MHSG.

8. The apparatus of claim 5, wherein the controller is configured to determine whether the pressure difference is equal to or less than a second pressure while performing the torque compensation control of the MHSG, and releases the torque compensation control of the MHSG when the pressure difference is equal to or less than the second pressure.

9. The apparatus of claim 5, wherein the data detector comprise:
   an accelerator pedal position detector configured for detecting a position of an accelerator pedal;
   a vehicle speed detector configured for detecting a speed of the mild hybrid electric vehicle;
   an engine speed detector configured for detecting a rotation speed of the engine; and
   a pressure difference detector configured for detecting the pressure difference between the front end portion and the rear end portion of the particulate filter.

* * * * *